United States Patent
Kim

(10) Patent No.: US 11,740,641 B2
(45) Date of Patent: Aug. 29, 2023

(54) PLATOONING CONTROLLER, A SYSTEM INCLUDING THE SAME, AND A METHOD THEREOF

(71) Applicants: HYUNDAI MOTOR COMPANY, Seoul (KR); KIA MOTORS CORPORATION, Seoul (KR)

(72) Inventor: Sang Jun Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 169 days.

(21) Appl. No.: 16/811,812

(22) Filed: Mar. 6, 2020

(65) Prior Publication Data

US 2021/0031767 A1 Feb. 4, 2021

(30) Foreign Application Priority Data

Jul. 30, 2019 (KR) .................. 10-2019-0092508

(51) Int. Cl.
| | |
|---|---|
| *B60W 30/16* | (2020.01) |
| *G08G 1/00* | (2006.01) |
| *B60Q 5/00* | (2006.01) |
| *B60Q 1/50* | (2006.01) |
| *B60W 50/14* | (2020.01) |

(52) U.S. Cl.
CPC ............ *B60W 30/162* (2013.01); *B60Q 1/50* (2013.01); *B60Q 5/00* (2013.01); *B60W 50/14* (2013.01); *G08G 1/22* (2013.01); *B60W 2050/146* (2013.01); *B60W 2540/215* (2020.02); *B60W 2554/802* (2020.02); *B60W 2554/804* (2020.02); *B60W 2754/30* (2020.02); *B60W 2754/50* (2020.02)

(58) Field of Classification Search
CPC .............. B60W 30/162; B60W 50/14; B60W 2540/215; B60W 2754/50; B60W 2554/804; B60W 2754/30; B60W 2554/802; B60W 2050/146; B60Q 1/50; B60Q 5/00; G08G 1/22
See application file for complete search history.

(56) References Cited

U.S. PATENT DOCUMENTS

| | | | |
|---|---|---|---|
| 2016/0232791 A1* | 8/2016 | Tosa .................... | B60W 30/143 |
| 2017/0344023 A1* | 11/2017 | Laubinger ............ | B60W 50/14 |
| 2018/0211546 A1* | 7/2018 | Smartt .................... | H04W 4/46 |
| 2019/0061758 A1* | 2/2019 | Ide ........................ | B60W 30/16 |

(Continued)

OTHER PUBLICATIONS

Google Image Search for "Minimum Speed Limit Sign" (Year: 2022).*

*Primary Examiner* — Dale W Hilgendorf
*Assistant Examiner* — Hana Lee
(74) *Attorney, Agent, or Firm* — LEMPIA SUMMERFIELD KATZ LLC

(57) ABSTRACT

A platooning controller, a vehicle system including the same, and a method thereof perform control during platooning. The platooning controller includes a processor that, when an outside vehicle cuts in a platooning line, performs platooning control depending on an intention of a user to perform the platooning control and a driving situation with the cut-in vehicle that cuts in the platooning line. The platooning controller also includes a storage that stores the result of performing the platooning control performed by the processor and information about the driving situation.

18 Claims, 7 Drawing Sheets

(56) References Cited

U.S. PATENT DOCUMENTS

| | | | |
|---|---|---|---|
| 2019/0179337 A1* | 6/2019 | Ji | G05D 1/0088 |
| 2019/0263404 A1* | 8/2019 | Bergquist | G05D 1/0293 |
| 2020/0057453 A1* | 2/2020 | Laws | G08G 1/22 |
| 2020/0209889 A1* | 7/2020 | Dev | G05D 1/0246 |
| 2021/0094464 A1* | 4/2021 | Aono | G08G 1/22 |

* cited by examiner

PLATOONING CONTROLLER, A SYSTEM INCLUDING THE SAME, AND A METHOD THEREOF

CROSS-REFERENCE TO RELATED APPLICATION

This application claims the benefit of priority to Korean Patent Application No. 10-2019-0092508, filed in the Korean Intellectual Property Office on Jul. 30, 2019, the entire contents of which are incorporated herein by reference.

TECHNICAL FIELD

The present disclosure relates to a platooning controller, a system including the same, and a method thereof, and more particularly, relates to technologies of performing control in response to a cut-in vehicle during platooning.

BACKGROUND

With the advancement of technologies of intelligent vehicles, platooning technology in which several vehicles are grouped to perform autonomous driving has been studied. Platooning has the advantages of reducing fuel use according to air resistance as vehicles maintain platooning, maintaining a smaller distance between vehicles and increasing the road use rate.

Particularly, in consideration of reducing fuel efficiency and reducing accident occurrence rate, mid-size and large commercial vehicles, such as buses and trucks, are frequently used for platooning. Because mid-size and large commercial vehicles have heavy weight and carry heavy cargo, when a vehicle suddenly cuts into a platooning line, it is difficult to quickly cope with the unexpected situation. A cut-in vehicle refers to a lane-changing vehicle that moves closely in front of another vehicle in the adjacent lane. Cut-in maneuvers are potentially dangerous and may lead to traffic collisions. For example, commercial vehicles during platooning may not recognize a cut-in vehicle. Thus, there is a high probability that an accident may occur.

Furthermore, although occurrence of a cut-in vehicle may be recognized during platooning, vehicles may simply passively release or maintain platooning, which is inefficient in terms of fuel efficiency and safety.

SUMMARY

The present disclosure has been made to solve the above-mentioned problems occurring in the prior art while advantages achieved by the prior art are maintained intact.

An aspect of the present disclosure provides a platooning controller for performing control in response to a cut-in vehicle based on an intention of a user and a driving situation when the cut-in occurs during platooning, a system including the same, and a method thereof.

The technical problems to be solved by the present inventive concept are not limited to the aforementioned problems, and any other technical problems not mentioned herein should be clearly understood from the following description by those of ordinary skill in the art to which the present disclosure pertains.

According to an aspect of the present disclosure, a platooning controller may include a processor that, when an outside vehicle cuts in a platooning line, performs platooning control depending on an intention of a user to perform the platooning control and a driving situation with the outside vehicle that cuts in the platooning line. The platooning controller may further include a storage that stores the result of performing the platooning control performed by the processor and information about the driving situation.

In an embodiment, the processor may determine whether the platooning controller is able to perform communication between platooning vehicles in the platooning line, when the outside vehicle cuts in front of a host vehicle in the platooning line.

In an embodiment, the processor may receive an input for whether to maintain a platooning state from the user, when the processor is able to perform the communication between the platooning vehicles in the platooning line and may control to maintain or release platooning based on the input of the user.

In an embodiment, the processor may release platooning, when the intention of the user to perform the platooning control indicates releasing the platooning. The processor may control to maintain or release the platooning depending on the driving situation, when the intention of the user to perform the platooning control indicates maintaining the platooning.

In an embodiment, the processor may increase a target inter-vehicle distance from the cut-in vehicle and may synchronize a setting speed of a host vehicle with a speed of a leading vehicle, when the intention of the user to perform the platooning control indicates maintaining platooning.

In an embodiment, the processor may alert or guide the cut-in vehicle to cut out, using at least one or more of emergency lights, high beams, and/or a warning sound, when the intention of the user to perform the platooning control indicates maintaining the platooning.

In an embodiment, the processor may determine whether the cut-in vehicle cuts out and may restore and set the target inter-vehicle distance and the setting speed of the host vehicle to values set before the cut-in vehicle cuts in the platooning line, when the cut-in vehicle cuts out.

In an embodiment, the processor may determine whether the cut-in vehicle cuts out and may continue performing the platooning control based on the increased target inter-vehicle distance and the setting speed, when the cut-in vehicle does not cut out.

In an embodiment, the processor may set a distance value between a vehicle in front of the cut-in vehicle in the platooning line and a vehicle behind the cut-in vehicle to an initial value and may calculate a time taken for the cut-in vehicle to cut in and maintain the platooning.

In an embodiment, the processor may release the platooning, when the time taken for the cut-in vehicle to maintain the platooning is greater than a predetermined reference time. The processor may maintain the platooning, when the time taken for the cut-in vehicle to maintain the platooning is less than or equal to the predetermined reference time.

In an embodiment, the processor may release the platooning when another vehicle newly cuts in, when the user requests to release the platooning, when a vehicle in front of the cut-in vehicle brakes emergently, or when a distance value between a vehicle in front of the cut-in vehicle in the platooning line and a vehicle behind the cut-in vehicle is greater than or equal to a certain value, when the cut-in vehicle maintains the platooning.

In an embodiment, the processor may decelerate a host vehicle to a minimum speed of a road where the host vehicle is traveling and may change the minimum speed to a constant speed, when the host vehicle is a leading vehicle when the outside vehicle cuts in the platooning line.

In an embodiment, the processor may maintain platooning, when the cut-in vehicle temporarily exits from an exit ramp or when the cut-in vehicle temporarily enters an entrance ramp and exits from an exit ramp.

In an embodiment, the processor may control a host vehicle using a smaller value between a target speed of the host vehicle behind the cut-in vehicle and a setting speed of the host vehicle. The target speed may be set for maintaining a target inter-vehicle distance from the cut-in vehicle. The setting speed may be synchronized with a speed of a leading vehicle.

In an embodiment, the platooning controller may further include a display that displays the result of performing the platooning control and the driving situation.

According to another aspect of the present disclosure, a vehicle system may include: a user input device that receives an intention of a user to perform platooning control from the user; a sensing device that senses a driving situation; and a platooning controller that performs the platooning control depending on the intention of the user to perform the platooning control and the driving situation, when an outside vehicle cuts in a platooning line.

In an embodiment, the platooning controller: may determine whether it is able to perform communication between platooning vehicles in the platooning line, when the outside vehicle cuts in front of a host vehicle in the platooning line; may receive an input for whether to maintain a platooning state from the user, when it is able to perform the communication between the platooning vehicles in the platooning line; and may control to maintain or release platooning based on the input of the user.

In an embodiment, the platooning controller: may increase a target inter-vehicle distance from the cut-in vehicle; may synchronize a setting speed of a host vehicle with a speed of a leading vehicle; and may guide the cut-in vehicle to cut out, using at least one or more of emergency lights, high beams, and/or a warning sound, when the intention of the user to perform the platooning control indicates maintaining platooning.

According to another aspect of the present disclosure, a platooning control method may include: sensing a cut-in vehicle that cuts in a platooning line; receiving an intention of a user to perform platooning control from the user; and performing the platooning control depending on the intention of the user to perform the platooning control and a driving situation.

In an embodiment, the platooning control method may further include determining whether it is able to communicate with a vehicle in the platooning line when the cut-in vehicle is detected and increasing a target inter-vehicle distance and synchronizing a setting speed of a host vehicle with a speed of a leading vehicle when it is able to communicate with the vehicle in the platooning line and when the user wants to maintain platooning, when the host vehicle is a vehicle behind the cut-in vehicle. The platooning control method may further include decelerating the host vehicle to a minimum speed of a road where the host vehicle is traveling and changing the minimum speed to a constant speed, when the host vehicle is a leading vehicle in the platooning line.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Figure 1:
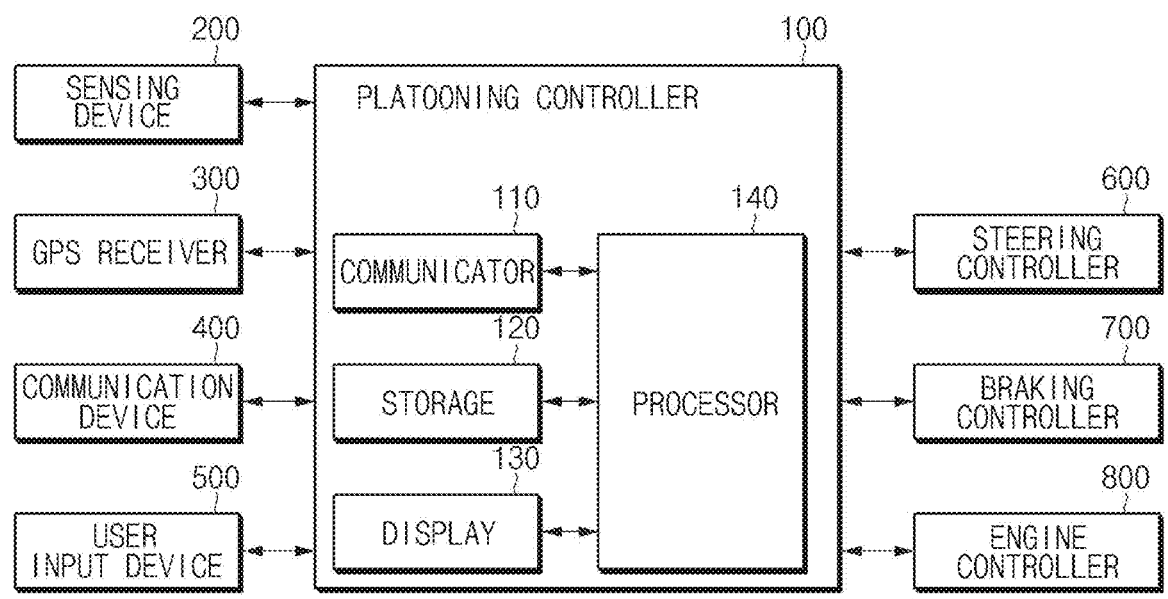
FIG. 1 is a block diagram illustrating a configuration of a vehicle system including a platooning controller according to an embodiment of the present disclosure.

Hereinafter, some embodiments of the present disclosure are be described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions is ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component. The terms do not limit the nature, sequence or order of the constituent components. Unless otherwise defined, all terms used herein, including technical or scientific terms, have the same meanings as those generally understood by those of ordinary skill in the art to which the present disclosure pertains. Such terms as those defined in a generally used dictionary are to be interpreted as having meanings equal to the contextual meanings in the relevant field of art. The terms are not to be interpreted as having ideal or excessively formal meanings unless clearly defined as having such in the present application.

An embodiment of the present disclosure discloses technologies of performing control in response to a cut-in vehicle based on an intention of a user and a driving situation in which a vehicle suddenly cuts in a platooning line during platooning.

Hereinafter, a description is given below in detail of embodiments of the present disclosure with reference to FIGS. 1 and 6.

FIG. 1 is a block diagram illustrating a configuration of a vehicle system that includes a platooning controller according to an embodiment of the present disclosure.

Referring to FIG. 1, the vehicle system according to an embodiment of the present disclosure may include a platooning controller 100, a sensing device 200, a global positioning system (GPS) receiver 300, a communication device 400, a user input device 500, a steering controller 600, a braking controller 700, and an engine controller 800.

When an outside vehicle cuts in a platooning line, the platooning controller 100 may perform platooning control depending on an intention of a user to perform the platooning control and a driving situation with the cut-in vehicle that cuts in the platooning line. In this case, the intention of the user to perform the platooning control may include maintaining or releasing platooning.

The platooning controller 100 may include a communicator 110, a storage 120, a display 130, and a processor 140.

The communicator 110 may be a hardware device implemented with various electronic circuits for transmitting and receiving a signal through wireless or wired connection. In an embodiment of the present disclosure, the communicator 110 may perform inter-vehicle communication through controller area network (CAN) communication, local interconnect network (LIN) communication, or the like and may communicate with the sensing device 200, the GPS receiver 300, the communication device 400, the user input device 500, the steering controller 600, the braking controller 700, and the engine controller 800.

The storage 120 may store the result of performing platooning control performed by the processor 140, information about a driving situation sensed by the sensing device 200, location information received from the GPS receiver 300, or the like. The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), magnetic disk, and/or an optical disk.

The display 130 may display information about a platooning situation. The display 130 may further display information indicating whether a cut-in occurs by another vehicle, i.e., an outside vehicle, when the cut-in occurs, correspondence control information due to the cut-in vehicle, or the like. Furthermore, the display 130 may display a screen for allowing a user to select to maintain or release a platooning state. In this case, the display 130 may be implemented in a touchpad mode to allow the user to select his or her intention. The display 130 may be implemented as a head-up display (HUD), a cluster, an audio video navigation (AVN), or the like. Furthermore, the display 130 may include at least one of a liquid crystal display (LCD), a thin film transistor-LCD (TFT-LCD), a light emitting diode (LED) display, an organic LED (OLED) display, an active matrix OLED (AMOLED) display, a flexible display, a bended display, and/or a three-dimensional (3D) display. Some displays thereof may be implemented as transparent displays configured as a transparent type or a semi-transparent type to see the outside. Moreover, the display 130 may be implemented as a touchscreen including a touch panel to be used as an input device other than an output device.

The processor 140 may be electrically connected with the communicator 110, the storage 120, the display 130, or the like and may electrically control the respective components. The processor 140 may be an electrical circuit that executes instructions of software and may perform a variety of data processing and calculation described below.

When an outside vehicle cuts in a platooning line, the processor 140 may perform platooning control depending on an intention of a user to perform the platooning control and a driving situation with the cut-in vehicle that cuts in the platooning line. When the outside vehicle cuts in front of a host vehicle in the platooning vehicle, the processor 140 may determine whether it is able to perform communication between platooning vehicles in the platooning line. When the processor 140 is able to perform the communication between the platooning vehicles in the platooning line, the processor 140 may receive an input for selecting whether to maintain a platooning state from the user.

Furthermore, the processor 140 may control to maintain or release platooning based on the input of the user. When the intention of the user to perform the platooning control indicates releasing a platooning state, the processor 140 may release the platooning. When the intention of the user to perform the platooning indicates maintaining the platooning state, the processor 140 may control to maintain or release the platooning depending on a driving situation.

In other words, when the intention of the user to perform the platooning control indicates maintaining the platooning, the processor 140 may increase a target inter-vehicle distance from the cut-in vehicle and may synchronize a setting speed of a host vehicle with a speed of a leading vehicle.

When the intention of the user to perform the platooning control indicates maintaining the platooning, the processor 140 may guide the cut-in vehicle to cut out, using at least one or more of emergency lights, high beams, and/or a warning sound.

Furthermore, the processor 140 may determine whether the cut-in vehicle cuts out. When the cut-in vehicle cuts out, the processor 140 may restore and set a target inter-distance distance and a setting speed of the host vehicle to values set before the cut-in vehicle cuts in. When the cut-in vehicle does not cut out, the processor 140 may continue performing the platooning control based on the increased target inter-vehicle distance and the setting speed.

The processor 140 may set a distance value between a vehicle in front of the cut-in vehicle in the platooning line and a vehicle behind the cut-in vehicle to an initial value and may calculate a time taken for the cut-in vehicle to cut in and maintain platooning. Thus, when the time taken for the cut-in vehicle to maintain the platooning is greater than or equal to a predetermined reference time, the processor 140 may release the platooning. When the time taken for the cut-in vehicle to maintain the platooning is less than the predetermined reference time, the processor 140 may maintain the platooning.

When the cut-in vehicle maintains the platooning, the processor 140 may release the platooning when another vehicle newly cuts in, when the user requests to release the platooning, when a vehicle in front of the cut-in vehicle brakes emergently, or when a distance value between a vehicle in front of the cut-in vehicle in the platooning line and a vehicle behind the cut-in vehicle is greater than or equal to a certain value. In this case, when the vehicle in front of the cut-in vehicle is a leading vehicle, the processor 140 may release the platooning when a distance value between the leading vehicle and the vehicle behind the cut-in vehicle is greater than or equal to the certain value.

When the host vehicle is a leading vehicle when an outside vehicle cuts in the platooning line, the processor 140 may decelerate the host vehicle to a minimum speed of a road where the host vehicle is traveling and may change the minimum speed to a constant speed. Furthermore, when the cut-in vehicle temporarily exits from an exit ramp or when the cut-in vehicle temporarily enters an entrance ramp and then exit from an entrance ramp, the processor 140 may maintain the platooning.

The sensing device 200 may detect a vehicle that cuts in or out in front of or behind the host vehicle and may obtain an inter-vehicle distance from a vehicle in front of or behind the host vehicle, a relative speed and relative acceleration/deceleration of the vehicle in front of or behind the host vehicle, a speed and acceleration/deceleration of the host vehicle, and the like. To this end, the sensing device 200 may include an ultrasonic sensor, a radar, a camera, a laser scanner and/or a corner radar, a light detection and ranging (LiDAR), an acceleration sensor, a yaw rate sensor, a torque sensor and/or wheel speed sensor, a steering angle sensor, or the like.

The GPS receiver 300 may receive a GPS signal and may provide the received GPS signal to the platooning controller 100 such that the platooning controller 100 may know current locations of the host vehicle and a vehicle in front of the host vehicle.

The communication device 400 may perform vehicle-to-vehicle (V2V) communication with vehicles that are platooning and may share information of vehicles in the platooning line.

The user input device 500 may receive a selection input for maintaining or releasing platooning from the user. To this end, the user input device 500 may be implemented as a switch, a touchpad, or the like.

The steering controller 600 may be configured to control a steering angle of the host vehicle and may include a steering wheel, an actuator interlocked with the steering wheel, and a controller for controlling the actuator.

The braking controller 700 may be configured to control to brake the host vehicle and may include a controller for controlling a brake.

The engine controller 800 may be configured to control to drive an engine of the host vehicle and may include a controller for controlling a speed of the host vehicle.

As such, when the cut-in vehicle enters a platooning line during platooning, in an embodiment of the present disclosure, the platooning controller 100: may receive an input for maintaining or releasing the platooning from the user; may control to maintain or release the platooning with regard to a driving situation when the user selects to maintain the platooning; and may synchronize a setting speed of a host vehicle with a speed of a leading vehicle when maintaining the platooning such that the host vehicle is not affected by acceleration of the cut-in vehicle in front of the host vehicle. Thus, the fuel consumption is minimized and safety driving is performed.

Figure 2:
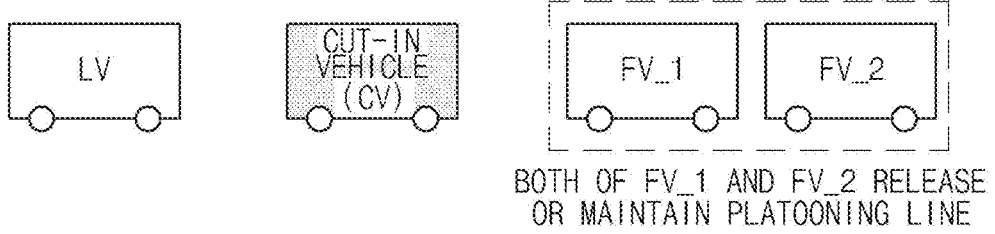
FIG. 2 is a drawing illustrating an example of an operation when a cut-in vehicle occurs during platooning according to an embodiment of the present disclosure.
Figure 3A:
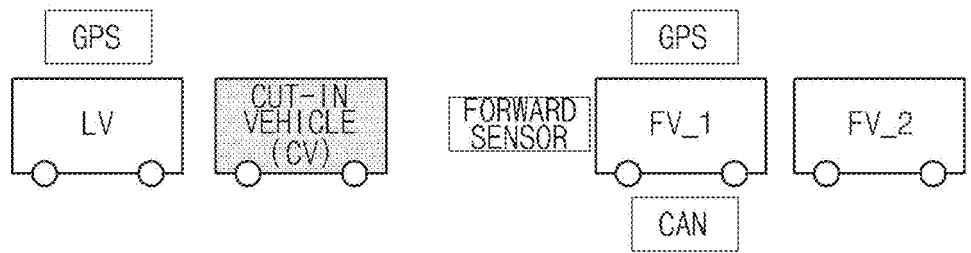
FIG. 3A is a drawing illustrating an example of an operation of performing control in response to a cut-in vehicle that occurs during platooning according to an embodiment of the present disclosure.
Figure 3B:
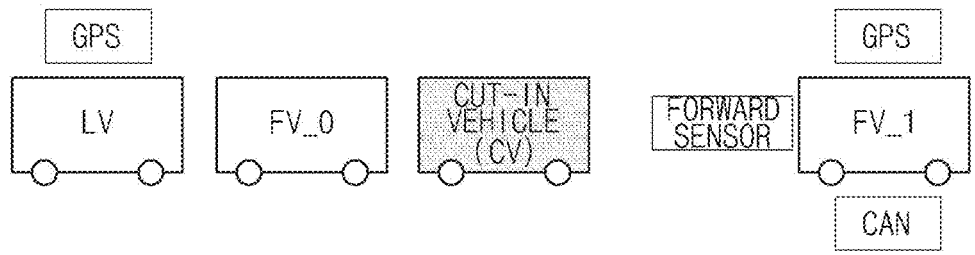
FIG. 3B is a drawing illustrating an example of an operation of performing control in response to a cut-in vehicle that occurs during platooning according to another embodiment of the present disclosure.

FIG. 2 is a drawing illustrating an operation when a cut-in occurs during platooning according to an embodiment of the present disclosure. FIG. 3A is a drawing illustrating an operation of performing control in response to a cut-in vehicle during platooning according to an embodiment of the present disclosure. FIG. 3B is a drawing illustrating an operation of performing control in response to a cut-in vehicle that occurs during platooning according to another embodiment of the present disclosure.

Referring to FIG. 2, in an embodiment of the present disclosure, a cut-in vehicle CV cuts in a platooning line that includes a leading vehicle LV and following vehicles FV_1 and FV_2 that sequentially follow the leading vehicle LV during platooning. As such, when the cut-in vehicle CV cuts in the platooning line, the following vehicles FV_1 and FV_2 that are traveling behind the cut-in vehicle CV may release or maintain platooning.

FIG. 3A illustrates an example in which a cut-in vehicle CV cuts in between a leading vehicle LV and a following vehicle FV_1. FIG. 3B illustrates an example in which a cut-in vehicle C cuts in between a following vehicle FV_0 behind a leading vehicle LV and a following vehicle FV_1.

In this case, the following vehicle FV_1 behind the cut-in vehicle CV, that is traveling immediately behind the cut-in vehicle CV, may adjust an inter-vehicle distance from the cut-in vehicle CV, a setting speed, or the like based on GPS information, information of a forward sensor, or controller area network (CAN) communication information. In other words, each of the leading vehicle LV and the following vehicles FV_0, FV_1, and FV_2 may share information sensed by the vehicles (e.g., information about the cut-in vehicle, an inter-vehicle distance from a forward vehicle, a relative speed, its location, or the like) through vehicle-to-everything (V2X) communication and may perform platooning control based on the shared information.

Figure 4:
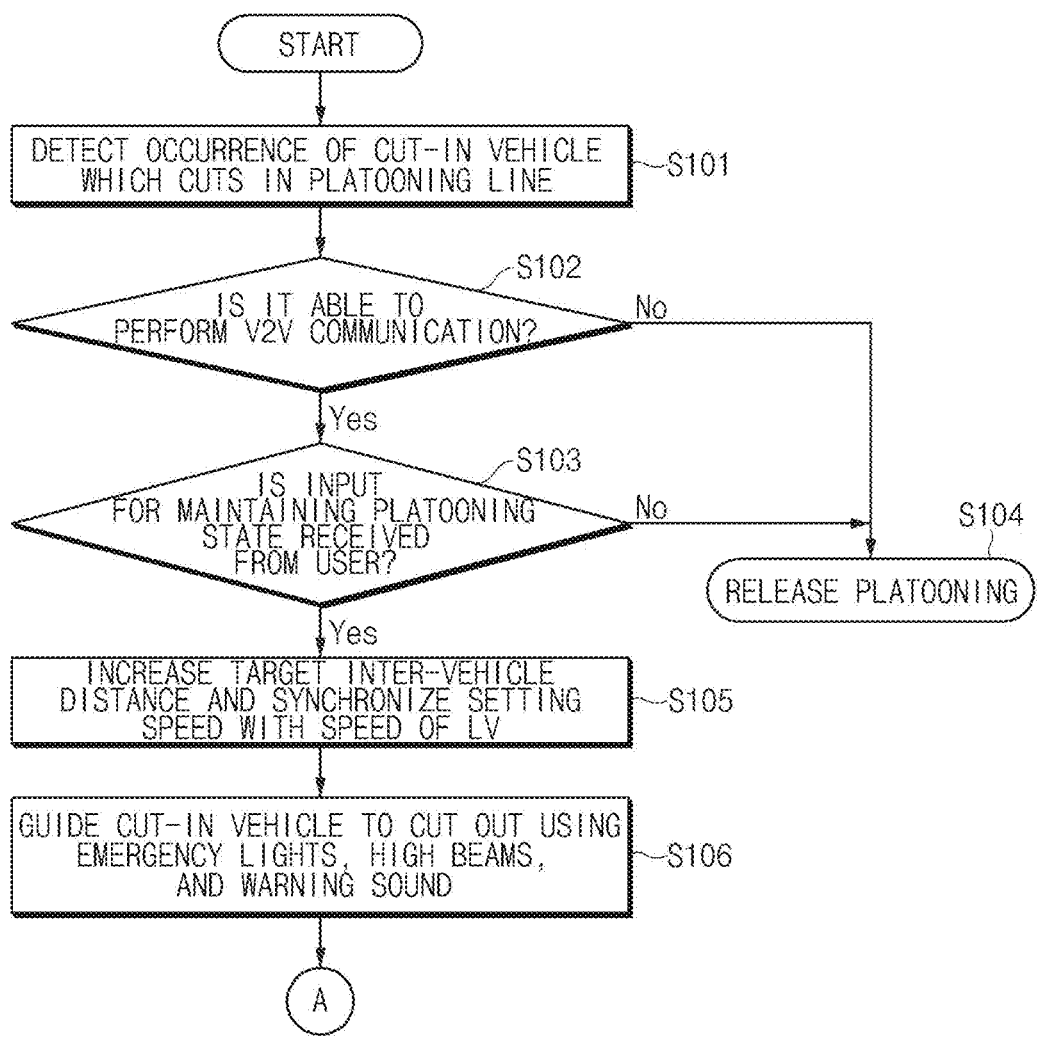
FIG. 4 is a flowchart illustrating a platooning control method according to an embodiment of the present disclosure.
Figure 5:
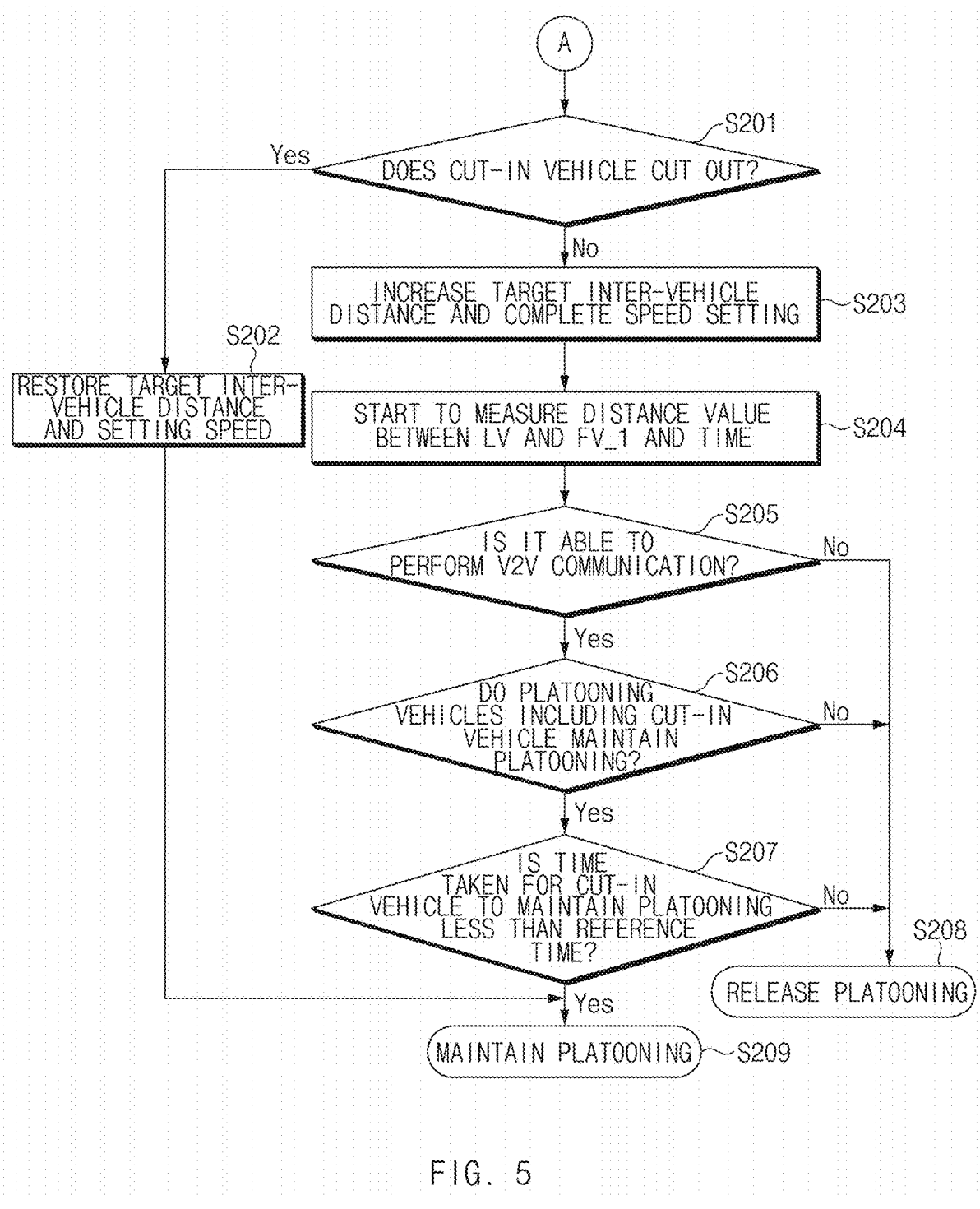
FIG. 5 is a flowchart consecutively illustrating a platooning control method of FIG. 4 according to an embodiment of the present disclosure.

Hereinafter, a description is given below of a platooning control method according to an embodiment of the present disclosure with reference to FIGS. 4 and 5. FIG. 4 is a flowchart illustrating a platooning control method according to an embodiment of the present disclosure. FIG. 5 is a flowchart consecutively illustrating a platooning control method of FIG. 4 according to an embodiment of the present disclosure.

Hereinafter, a description is given below of a platooning control method according to an example. In this example, a cut-in vehicle CV cuts in front of a following vehicle FV_1 in a platooning line and the following vehicle FV_1 behind the cut-in vehicle CV performs platooning control in response to the cut-in vehicle CV. In this case, it is assumed that a platooning controller 100 loaded into the following vehicle FV_1 behind the cut-in vehicle CV performs the processes of FIGS. 4 and 5 in FIG. 1. Furthermore, in the descriptions of FIGS. 4 and 5, an operation described as being performed by an apparatus may be understood as being controlled by a processor 140 of the platooning controller 100.

Referring to FIG. 4, in S101, the apparatus of the following vehicle FV_1 behind the cut-in vehicle CV may detect whether the cut-in vehicle CV cuts in a platooning line. In this case, the following vehicle FV_1 behind the cut-in vehicle CV may detect the occurrence of the cut-in by the vehicle CV that cuts in front of the following vehicle FV_1 using a sensing device 200, a GPS receiver 300, a communication device 400, and the other elements of FIG. 1.

In this case, a leading vehicle LV that is traveling in front of the cut-in vehicle CV may detect the occurrence of the cut-in by the vehicle CV behind the leading vehicle LV based on a rearward sensor of its sensing device 200 or may receive cut-in generation information from the following vehicle FV_1 behind the cut-in vehicle CV and may detect occurrence of the cut-in vehicle CV. In FIG. 4, in an embodiment of the present disclosure, a vehicle immediately in front of the cut-in vehicle CV is the leading vehicle LV. However, embodiments of the present disclosure are not limited thereto. For example, when there is a following vehicle FV_1 during platooning between the leading vehicle LV and the cut-in vehicle CV, the leading vehicle LV may receive the result sensed by a rearward sensor of the following vehicle FV_1 in front of the cut-in vehicle CV or the result sensed by a forward sensor of the following vehicle FV_1 behind the cut-in vehicle CV and may recognize the occurrence of the cut-in by the vehicle CV.

When the cut-in by the vehicle CV occurs during the platooning, in S102, the apparatus may generate a cut-in flag and may identify a V2V communication state between the platooning vehicles. In other words, when the cut-in vehicle CV is a large vehicle such as a trailer, because there is a concern to interfere with the communication between the platooning vehicles, the apparatus may determine whether it is able to perform V2V communication between the platooning vehicles. When a communication error is greater than or equal to a certain value, the apparatus may release a platooning line. When the communication error is less than the certain value, the apparatus may continue performing platooning control.

The apparatus of the following vehicle FV_1 behind the cut-in vehicle CV may attempt to communicate with the vehicles in the platooning line when the cut-in by the vehicle CV occurs in front of the following vehicle FV_1. The apparatus of the following vehicle FV_1 may determine that it is able to perform communication when receiving a response signal.

In S103, the apparatus of the following vehicle FV_1 behind the cut-in vehicle CV may receive an intention of a user to maintain or release a platooning state. In this case, the apparatus may receive a selection input for maintaining or releasing platooning from the user such that the user determines a current situation and performs suitable control. In this case, the apparatus of the following vehicle FV_1 behind the cut-in vehicle CV may display a pop-up window or a text for querying the user whether to maintain or release a platooning state after the cut-in by the vehicle CV occurs such that the user selects and inputs the maintaining or releasing of the platooning state on the pop-up window or the text.

When receiving the input for releasing the platooning from the user, the apparatus of the following vehicle FV_1 behind the cut-in vehicle CV may release the platooning.

On the other hand, when receiving an input for maintaining the platooning from the user, in S105, the apparatus of the following vehicle FV_1 behind the cut-in vehicle CV may increase a target inter-vehicle distance and may synchronize a setting speed of the following vehicle FV_1 with a speed of the leading vehicle LV. In this case, the apparatus of the following vehicle FV_1 may communicate with the leading vehicle LV at a predetermined period to follow the setting speed of the leading vehicle LV. Furthermore, a following vehicle FV_2 that follows the following vehicle FV_1 may maintain an existing interval with the following vehicle FV_1 in front of the following vehicle FV_2.

In this case, the target inter-vehicle distance may be a time gap. For example, when the target inter-vehicle distance increases from 0.5 seconds to 1.5 seconds, because the apparatus of the following vehicle FV_1 does not communicate with the cut-in vehicle CV while maintaining the platooning, the target inter-vehicle distance is set to increase an inter-vehicle distance and to ensure safety.

The apparatus of the following vehicle FV_1 behind the cut-in vehicle CV may transmit the intention of the user to maintain the platooning to the leading vehicle LV. When the following vehicle FV_1 behind the cut-in vehicle CV maintains the platooning, the leading vehicle LV may gradually and automatically decelerate to a minimum speed of a road where the leading vehicle LV is currently traveling and may travel at a constant speed. Thus, the following vehicle FV_1 behind the cut-in vehicle CV may be synchronized with a speed of the leading vehicle LV to travel at a constant speed. When the cut-in vehicle CV is continuously traveling in the platooning line, the following vehicle FV_1 behind the cut-in vehicle CV may fail to respond to acceleration of the cut-in vehicle CV.

In S106, the apparatus of each of the platooning vehicles LV, FV1, and the like that are traveling in front of and behind the cut-in vehicle CV may turn on emergency lights or high beams or may output a warning sound to guide the cut-in vehicle CV to cut out of a current driving lane of the cut-in vehicle CV.

Hereinafter, referring to FIG. 5, in S201, the apparatus of the following vehicle FV_1 may guide the cut-in vehicle CV to cut out and may determine whether the cut-in vehicle CV cuts out. When the cut-in vehicle CV cuts out, in S202, the apparatus of the following vehicle FV_1 may restore a target inter-vehicle distance and a setting speed to values set before the cut-in vehicle CV cuts in.

On the other hand, although the apparatus of the following vehicle FV_1 guides the cut-in vehicle CV to cut out, when the cut-in vehicle CV does not cut out, in S203, the apparatus of the following vehicle FV_1 may control the following vehicle FV_1 to travel at the increased target inter-vehicle distance and at the setting speed.

Thereafter, when the cut-in vehicle CV continues traveling in the platooning line without cutting out, in S204, the apparatus of the following vehicle FV_1: may calculate a distance value between the leading vehicle LV and the following vehicle FV_1 based on GPS information; may set the distance value based on the GPS information to an initial value; and may measure a time taken for the cut-in vehicle CV to travel in the platooning line. In other words, the apparatus of the following vehicle FV_1 may measure a time taken for the cut-in vehicle CV to maintain platooning.

In S205, the apparatus of the following vehicle FV_1 may determine whether it is able to perform V2V communication again to ensure safety in the state where the inter-vehicle distance is increased based on the target inter-vehicle distance.

When it is unable to perform the V2V communication, in S207, the apparatus of the following vehicle FV_1 may release the platooning. In this case, when platooning vehicles including the cut-in vehicle CV maintains the platooning, the apparatus of the following vehicle FV_1 may release the platooning when situations 1) to 4) below occur:

1) when a new cut-in flag occurs,
2) when users of the following vehicles FV_1 and FV_2 request to release the platooning or press their brake pedals,
3) when the cut-in vehicle CV brakes emergently, and
4) when the distance value between the leading vehicle LV and the following vehicle FV_1 is greater than or equal to a certain value.

The situation of when the distance value between the leading vehicle LV and the following vehicle FV_1 is greater than or equal to the certain value may include when a new cut-in vehicle cuts in front of the existing cut-in vehicle CV or when a distance between the leading vehicle LV and the following vehicle FV_1 increases after a distance between the existing cut-in vehicle CV and the leading vehicle LV increases as the existing cut-in vehicle CV brakes continuously by any reason.

When at least one of the situations 1) to 4) above occurs while the platooning vehicles including the cut-in vehicle CV maintain the platooning, the apparatus of the following vehicle FV_1 may release the platooning.

As shown in FIG. 3A, when the cut-in vehicle CV cuts in between the leading vehicle LV and the following vehicle FV_1, and when the following vehicle FV_1 maintains an inter-vehicle distance between the cut-in vehicle CV and the following vehicle FV_1 during a certain time and when the cut-in vehicle CV brakes, the following vehicle FV_1 may travel at a speed lower than the leading vehicle LV to maintain an inter-vehicle distance from the cut-in vehicle CV in front of the following vehicle FV_1. Thereafter, as the cut-in vehicle CV accelerates, although a distance value between the cut-in vehicle CV and the following vehicle FV_1 is increased because the following vehicle FV_1 is not higher in speed than the leading vehicle LV because of interworking with a speed of the leading vehicle LV, a distance value between the leading vehicle LV and the following vehicle FV_1 may be increased. Thus, the apparatus of the following vehicle FV_1 or the apparatus of the leading vehicle LV may release the platooning when the distance value between the leading vehicle LV and the following vehicle FV1 is greater than or equal to a certain value. In this case, the apparatus of the following vehicle FV_1 and the apparatus of the leading vehicle LV may obtain the distance value between the leading vehicle LV and the following vehicle FV_1 based on information shared through V2X communication. The apparatus of the following vehicle FV_1 may obtain the distance value between the leading vehicle LV and the following vehicle FV_1 based on the location information of the following vehicle FV_1 and the location information of the leading vehicle LV, received from the leading vehicle LV. The apparatus of the leading vehicle LV may obtain the distance value between the leading vehicle LV and the following vehicle FV_1 based on the location information of the leading vehicle LV and the location information of the following vehicle FV_1, received from the following vehicle FV_1.

As shown in FIG. 3B, when the cut-in vehicle CV cuts in between the following vehicle FV_0 and the following vehicle FV_1, the apparatus of the following vehicle FV_1 may release platooning when a distance value between the leading vehicle LV and the following vehicle FV_1 or a distance value between the following vehicle FV_0 in front of the cut-in vehicle CV and the following vehicle FV_1 is greater than or equal to a certain value.

For example, while the leading vehicle LV and the following vehicle FV_1 are traveling at a speed of 80 km/h (49 mph), when the cut-in vehicle CV cuts in between the leading vehicle LV and the following vehicle FV_1, the leading vehicle LV travels at a minimum speed (e.g., 60 km/h (37 mph)) in a road where the leading vehicle LV is traveling to guide the cut-in vehicle CV to cut out and the following vehicle FV_1 interworks with a speed of the leading vehicle LV to travel at a speed of 60 km/h. Thus, when the cut-in vehicle CV travels at a speed (e.g., 40 km/h (24 mph)) lower than the leading vehicle LV, the following vehicle FV_1 may decrease its speed to 40 km/h to control an inter-vehicle distance from the cut-in vehicle CV. Thus, when the leading vehicle LV continues traveling at a speed of 60 km/h and the following vehicle FV_1 travels at a speed of 40 km/h, the distance between the leading vehicle LV and the following vehicle FV_1 continues to increase. As a result, the platooning may be released.

Thereafter, when the apparatus of the following vehicle FV_1 is able to perform V2V communication in S205, in S206, the apparatus of the following vehicle FV_1 may check whether the cut-in vehicle CV is maintaining platooning. When the cut-in vehicle CV is maintaining the platooning, in S207, the apparatus of the following vehicle FV_1 may determine whether a time taken for the cut-in vehicle CV to maintain the platooning is less than a predetermined reference time. When the time taken for the cut-in vehicle CV to maintain the platooning is greater than or equal to the reference time, in S208, the apparatus of the following vehicle FV_1 may release the platooning. When the time taken for the cut-in vehicle CV to maintain the platooning is less than the reference time, in S209, the apparatus of the following vehicle FV_1 may maintain the platooning. In this case, when the time taken for the cut-in vehicle CV to maintain the platooning is greater than or equal to the reference time, the apparatus of the following vehicle FV_1 may display it on a display 130 of FIG. 1 such that the user may recognize it. This is because there is a safety risk when an abnormal platooning situation continues without limit. When the cut-in vehicle CV temporarily exits from an interchange (IC) or when the cut-in vehicle CV temporarily enters the IC and then exits from the IC, the apparatus of the following vehicle FV_1 may maintain the platooning to increase fuel efficiency and convenience of a driver.

Furthermore, the reason why the setting speed of the following vehicle FV_1 is synchronized with the speed of the leading vehicle LV in S105 is for the following vehicle FV_1 not to follow the cut-in vehicle CV when the cut-in vehicle CV unnecessarily repeats acceleration or deceleration between the leading vehicle LV and the following vehicle FV_1. Thus, the loss of fuel efficiency is reduced.

There is a high probability that the cut-in vehicle CV will not travel at a constant speed due to a route or a surrounding traffic situation that forces the cut-in vehicle to cut out from a current situation. Thus, as the leading vehicle LV and the following vehicle FV_1 travel at a constant speed, unnecessary acceleration and deceleration by the cut-in vehicle CV may be reduced. In other words, the following vehicle FV_1 may travel at a constant speed although the cut-in vehicle CV accelerates and may control to maintain a safety distance depending on an inter-vehicle distance only when the cut-in vehicle CV decelerates.

An embodiment of the present disclosure may perform platooning control to minimize fuel efficiency consumption and increase safety with regard to an intention of the user and a driving situation without simply releasing or maintaining platooning when a cut-in vehicle occurs during the platooning.

Figure 6:
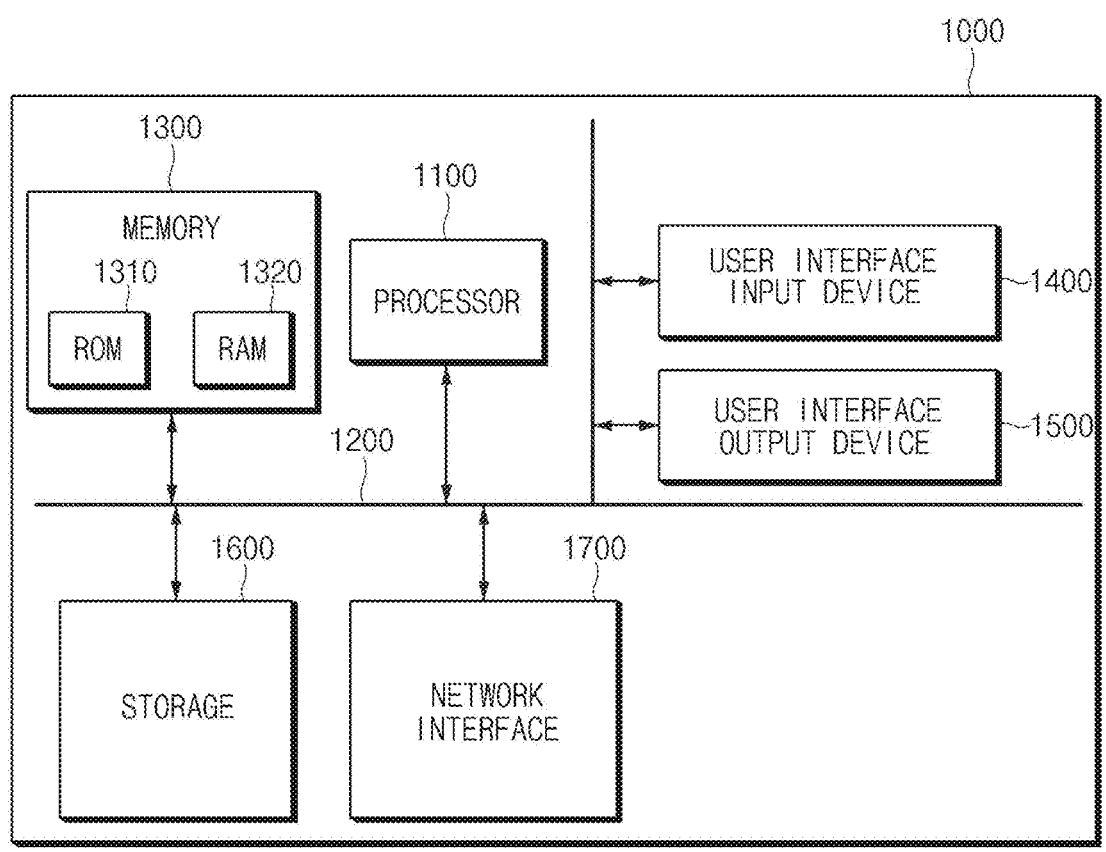
FIG. 6 is a block diagram illustrating a computing system according to an embodiment of the present disclosure.

FIG. 6 is a block diagram illustrating a computing system according to an embodiment of the present disclosure.

Referring to FIG. 6, a computing system 1000 may include at least one processor 1100, a memory 1300, a user interface input device 1400, a user interface output device 1500, storage 1600, and/or a network interface 1700, that are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM.

The storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The present technology may increase fuel efficiency and safety by performing control in response to a cut-in vehicle based on an intention of a user and a driving situation when the cut-in vehicle occurs during platooning.

In addition, various effects directly or indirectly ascertained through the present disclosure may be provided.

Hereinabove, although the present disclosure has been described with reference to various embodiments and the accompanying drawings, the present disclosure is not limited thereto, but may be variously modified and altered by those of ordinary skill in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A platooning controller, comprising:
a processor configured to, when a cut-in vehicle cuts in a platooning line, perform a platooning control depending on an intention of a user of a host vehicle driving behind the cut-in vehicle to perform the platooning control and a driving situation with the cut-in vehicle; and
a storage storing the result of performing the platooning control performed by the processor and information about the driving situation,
wherein the processor receives, from the user, an input of whether to maintain a platooning state and transmits the input of the user to a leading vehicle,
wherein, in response to a determination that the cut-in vehicle cuts in the platooning line and that the intention of the user to perform the platooning control indicates maintaining the platooning state, the processor decelerates all platooning vehicles including the leading vehicle and the host vehicle to a minimum speed allowed by a speed limit of a road where the platooning vehicles are traveling to guide the cut-in vehicle to cut-out the platooning line,
wherein the processor controls the host vehicle using a smaller value between a target speed of the host vehicle behind the cut-in vehicle, the target speed being for maintaining a target inter-vehicle distance from the cut-in vehicle, and a setting speed of the host vehicle, the setting speed being synchronized with a speed of the leading vehicle,
wherein, in response to a determination that the cut-in vehicle does not cut out, the processor sets a distance value between a vehicle in front of the cut-in vehicle in the platooning line and the host vehicle driving behind the cut-in vehicle as an initial value,
wherein, when the cut-in vehicle cuts in front of the host vehicle in the platooning line, the processor determines whether the platooning controller is able to perform communication between all the platooning vehicles in the platooning line, and
wherein, in response to a determination that the processor cannot perform communication between all the platooning vehicles, the processor releases the platooning when another vehicle newly cuts in, when the user requests to release the platooning, when the cut-in vehicle brakes emergently, or when a distance value between the leading vehicle and the host vehicle is greater than or equal to a certain value.

2. The platooning controller of claim 1, wherein the processor receives an input for whether to maintain the platooning state from the user, when it is able to perform the communication between the platooning vehicles in the platooning line and controls to maintain or release platooning based on the input of the user.

3. The platooning controller of claim 2, wherein the processor increases a target inter-vehicle distance from the cut-in vehicle and synchronizes a setting speed of the host vehicle with a speed of the leading vehicle, when the intention of the user to perform the platooning control indicates maintaining the platooning.

4. The platooning controller of claim 3, wherein the processor guides the cut-in vehicle to cut out, using at least one or more of emergency lights, high beams, and/or a warning sound, when the intention of the user to perform the platooning control indicates maintaining the platooning.

5. The platooning controller of claim 4, wherein the processor determines whether the cut-in vehicle cuts out and restores and sets the target inter-vehicle distance and the setting speed of the host vehicle to values set before the cut-in vehicle cuts in, when the cut-in vehicle cuts out.

6. The platooning controller of claim 4, wherein the processor determines whether the cut-in vehicle cuts out and continues performing the platooning control based on the increased target inter-vehicle distance and the setting speed, when the cut-in vehicle does not cut out.

7. The platooning controller of claim 6, wherein the processor calculates a time taken for the cut-in vehicle to cut in and maintain the platooning.

8. The platooning controller of claim 7, wherein the processor releases the platooning, when the time taken for the cut-in vehicle to maintain the platooning is greater than a predetermined reference time, and maintains the platooning, when the time taken for the cut-in vehicle to maintain the platooning is less than or equal to the predetermined reference time.

9. The platooning controller of claim 6, wherein the processor releases the platooning when another vehicle newly cuts in, when the user requests to release the platooning, when a vehicle in front of the cut-in vehicle brakes emergently, or when a distance value between a vehicle in front of the cut-in vehicle in the platooning line and the vehicle driving behind the cut-in vehicle is greater than or equal to a certain value, when the cut-in vehicle maintains the platooning.

10. The platooning controller of claim 1, wherein the processor releases platooning, when the intention of the user to perform the platooning control indicates releasing the platooning, and controls to maintain or release the platooning depending on the driving situation, when the intention of the user to perform the platooning control indicates maintaining the platooning.

11. The platooning controller of claim 1, wherein the processor changes the minimum speed to a constant speed, when the host vehicle is the leading vehicle and when the cut-in vehicle cuts in the platooning line.

12. The platooning controller of claim 1, wherein the processor maintains platooning, when the cut-in vehicle temporarily exits from an exit ramp or when the cut-in vehicle temporarily enters an entrance ramp and exits from an exit ramp.

13. The platooning controller of claim 1, further comprising:
a display configured to display a result of performing the platooning control and the driving situation.

14. A vehicle system, comprising:
a user input device configured to receive an intention of a user of a host vehicle driving behind a cut-in vehicle to perform platooning control from the user;
a sensor configured to sense a driving situation; and
a processor configured to perform the platooning control depending on the intention of the user to perform the platooning control and the driving situation, when the cut-in vehicle cuts in a platooning line,
wherein the processor receives an input for whether to maintain a platooning state from the user, and transmits the input of the user to a lead vehicle,
wherein, in response to a determination that the cut-in vehicle cuts in the platooning line and that the intention of the user to perform the platooning control indicates maintaining the platooning state, the processor decelerates all platooning vehicles including the leading vehicle and the host vehicle to a minimum speed allowed by a speed limit of a road where the platooning vehicles are traveling to guide the cut-in vehicle to cut-out the platooning line,
wherein the processor controls the host vehicle using a smaller value between a target speed of the host vehicle behind the cut-in vehicle, the target speed being for maintaining a target inter-vehicle distance from the cut-in vehicle, and a setting speed of the host vehicle, the setting speed being synchronized with a speed of the leading vehicle, and
wherein, in response to a determination that the cut-in vehicle does not cut out, the processor sets a distance value between a vehicle in front of the cut-in vehicle in the platooning line and the host vehicle driving behind the cut-in vehicle as an initial value,
wherein, when the cut-in vehicle cuts in front of the host vehicle in the platooning line, the processor determines whether the platooning controller is able to perform communication between all the platooning vehicles in the platooning line, and
wherein, in response to a determination that the processor cannot perform communication between all the platooning vehicles, the processor releases the platooning when another vehicle newly cuts in, when the user requests to release the platooning, when the cut-in vehicle brakes emergently, or when a distance value between the leading vehicle and the host vehicle is greater than or equal to a certain value.

15. The vehicle system of claim 14, wherein the processor receives an input for whether to maintain a platooning state from the user, when it is able to perform the communication between the platooning vehicles in the platooning line, and controls to maintain or release platooning based on the input of the user.

16. The vehicle system of claim 14, wherein the processor increases a target inter-vehicle distance from the cut-in vehicle and synchronizes a setting speed of the host vehicle with a speed of the leading vehicle and guides the cut-in vehicle to cut out, using at least one or more of emergency lights, high beams, and/or a warning sound, when the intention of the user to perform the platooning control indicates maintaining platooning.

17. A platooning control method, comprising:
sensing a cut-in vehicle that cuts in a platooning line;
receiving an intention of a user of a host vehicle driving behind the cut-in vehicle to perform platooning control and to maintain a platooning state from the user;
transmitting the intention of the user to a leading vehicle;
performing the platooning control depending on the intention of the user to perform the platooning control and a driving situation;
decelerating, in response to a determination that the cut-in vehicle cuts in the platooning line and that the intention of the user to perform the platooning control indicates maintaining the platooning state, all platooning vehicles including the leading vehicle and the host vehicle to a minimum speed allowed by a speed limit of a road where the platooning vehicles are traveling to guide the cut-in vehicle to cut-out the platooning line;
controlling the host vehicle using a smaller value between a target speed of the host vehicle behind the cut-in vehicle, the target speed being for maintaining a target inter-vehicle distance from the cut-in vehicle, and a setting speed of the host vehicle, the setting speed being synchronized with a speed of the leading vehicle;
setting a distance value between a vehicle in front of the cut-in vehicle in the platooning line and the host vehicle driving behind the cut-in vehicle as an initial value, in response to a determination that the cut-in vehicle does not cut out;
when the cut-in vehicle cuts in front of the host vehicle in the platooning line, determining that communication can be performed between all the platooning vehicles in the platooning line; and
in response to a determination that communication between all the platooning vehicles cannot be performed, releasing the platooning when another vehicle newly cuts in, when the user requests to release the platooning, when the cut-in vehicle brakes emergently, or when a distance value between the leading vehicle and the host vehicle is greater than or equal to a certain value.

18. The platooning control method of claim 17, further comprising:
determining whether the cut-in vehicle is able to communicate with a vehicle in the platooning line when the cut-in vehicle is detected and increasing a target inter-vehicle distance and synchronizing a setting speed of the host vehicle with a speed of the leading vehicle when the cut-in vehicle is able to communicate with the vehicle in the platooning line and when the user wants to maintain platooning, when the host vehicle is a vehicle behind the cut-in vehicle; and
changing the minimum speed to a constant speed, when the host vehicle is the leading vehicle in the platooning line.

* * * * *